(12) United States Patent
Stevens

(10) Patent No.: US 8,434,013 B2
(45) Date of Patent: Apr. 30, 2013

(54) NAVIGATING SOURCE CODE USING ANNOTATED TOPOGRAPHIC IMAGE(S)

(75) Inventor: Matthew J. Stevens, Malvern, PA (US)

(73) Assignee: Oracle America, Inc., Redwood Shores, CA (US)

( * ) Notice: Subject to any disclaimer, the term of this patent is extended or adjusted under 35 U.S.C. 154(b) by 1729 days.

(21) Appl. No.: 11/441,985

(22) Filed: May 26, 2006

(65) Prior Publication Data

US 2007/0277149 A1 Nov. 29, 2007

(51) Int. Cl.
*G06F 3/033* (2006.01)

(52) U.S. Cl.
USPC ........... 715/763; 715/764; 715/853; 717/105; 717/109

(58) Field of Classification Search .................. 717/105, 717/104, 144, 109; 715/763, 764, 853
See application file for complete search history.

(56) References Cited

U.S. PATENT DOCUMENTS

| | | | | |
|---|---|---|---|---|
| 5,386,508 A | * | 1/1995 | Itonori et al. ................. | 717/109 |
| 5,862,379 A | | 1/1999 | Rubin et al. | |
| 6,385,768 B1 | * | 5/2002 | Ziebell ......................... | 717/121 |
| 6,502,233 B1 | * | 12/2002 | Vaidyanathan et al. ....... | 717/101 |
| 6,851,107 B1 | * | 2/2005 | Coad et al. .................... | 717/108 |
| 6,859,909 B1 | | 2/2005 | Lerner et al. | |
| 6,993,710 B1 | * | 1/2006 | Coad et al. .................... | 715/202 |
| 7,062,718 B2 | | 6/2006 | Kodosky et al. | |
| 2007/0256054 A1 | * | 11/2007 | Byrne et al. .................. | 717/113 |

OTHER PUBLICATIONS

Cohen et al., "Designing to Support Adversarial Collaboration", Copyright 2000.*
Nguyen et al., "The Software Concordance: A new Software Document Management Environment", Oct. 2003.*

* cited by examiner

*Primary Examiner* — Andrey Belousov
*Assistant Examiner* — Meseker Takele
(74) *Attorney, Agent, or Firm* — Osha Liang LLP

(57) ABSTRACT

A mechanism is disclosed for enabling a user to navigate to specific portions of a file containing computer code. A textual form and non-textual aspects of the file are rendered in a plurality of sections of a display. The non-textual aspects of the file are depicted by non-textual rendering elements in a topographic image in one of the plurality of sections. The textual form of the file is shown in at least one other of the plurality of sections. When a user interface event is detected on a rendering element, the appearance of that element is altered. The section that displays the textual form of the file may scroll to a portion of the file containing a corresponding code portion and renders the code portion in the textual form.

16 Claims, 11 Drawing Sheets

NAVIGATING SOURCE CODE USING ANNOTATED TOPOGRAPHIC IMAGE(S)

BACKGROUND

Reading and writing source code is a primary task of a computer programmer. The vast quantity of source code in many projects presents huge challenges for the programmer. One of the most difficult aspects of editing source code is navigating around in the source code. A source code file, in a "textual rendering", is regularly tall and narrow (e.g. 80 characters wide and thousands of lines from top to bottom). Containing hundreds or even thousands of lines of code, a source code file in a "textual rendering" rarely fits on the computer monitor in its entirety. Thus, a programmer has to use a scrollbar to navigate to different sections of the source code. Without seeing the entire set of source code, navigating to portions of the source code can be like "trying to find a way through the woods."

Over the years source code editors have seen improvements in several ways. "Syntax highlighting" improves the recognition of code portions representing different language structures and syntax via textual font changes. For example, commented text, variable declarations, structure identifiers may all have different fonts. Similarly, the ubiquitous "colored squiggly" may be used to indicate misspelled words or inappropriately applied grammar. A disadvantage of these text enhancing techniques is that the extra information presented must be rendered together with the textual rendering of the source code file. This means that the programmer has to look through the text of the source code to find them. A further disadvantage of these techniques is that they do not solve or even address the problem of visually fitting a file containing lengthy computer code on the computer monitor in its entirety.

In some integrated environments, scrollbars of source code editors include colored lines or glyphs to indicate the relative positions of methods. This technique would help a developer navigate using the scrollbar to a method within a file. A disadvantage of this technique is that it does not reveal structures and patterns of the computer code in the file as a whole or even within a single method. A further disadvantage is that the colored lines or glyphs only provide navigational information to a textual rendering of the computer code, and do not provide information about logics or relationships in the source code file.

Because of these limitations, the existing techniques are not as visually helpful to a programmer as would be desired. As a result, an improved visual rendering of a file containing computer code, which would enable a programmer to better navigate to specific portions of source code within the file, is needed.

SUMMARY

It has been observed by Applicant that many programmers think "visually". That is, they do not think of a computer program as a set of text but rather as a set of visual elements. That being the case, a program may best be presented to a user in the form of a graphic image comprising a plurality of rendering elements that correlate to corresponding code portions. If this graphical image is rendered concurrently with a textual rendering of a source code file, and if the rendering elements are correlated with corresponding code portions, then the graphical image may be used to navigate through the source code file. For example, a programmer may select a rendering element in the graphical image and the corresponding code portion may be displayed in the text rendering portion of the display.

In accordance with this observation, in one embodiment of the present invention, there is provided a user interface (UI) mechanism for enabling textual form and non-textual aspects of a file containing computer code to be rendered in different sections of a display. The different sections of the display are rendered concurrently so that a user can see both textual form and non-textual aspects of the file at the same time. In a topographic image section that renders non-textual aspects of the file, the non-textual aspects are rendered concurrently with overlay. With such a display, the user can see the non-textual aspects of the file in its entirety.

In one embodiment, a first section of the display may show textual form of a file that comprises various code portions. A second section of the display may show a topographic image of non-textual aspects of the file. The non-textual aspects of the file are represented by rendering elements. The rendering elements in the second section can be rendered concurrently with overlay. By showing various rendering elements and textual form of the file in each section of the display, the UI mechanism enables the user to see the textual form and non-textual aspects of the file at the same time.

Given this concurrent display of both topographic image and textual form of a file, the user can easily navigate to a corresponding code portion of a file relating to a non-textual rendering element in a topographic image. For example, the user can move a mouse to a first position in the topographic image at or near the non-textual rendering element and selects the first position by, for example, clicking a mouse button. At least one user interface event is triggered by the user's actions. When the UI mechanism receives an indication of user selection at the first position in the topographic image, it correlates the first position with a second position in the file, and then renders a code portion of the file in the first section of the display such that the second position is within the portion of the file.

Conversely, with a code portion of the file displayed in the first section of the display, the user can easily navigate to a location on the topographic image that represents non-textual aspects of the code portion. For example, the user can move a mouse to a third position in the file and selects the third position by, for instance, clicking a mouse button. At least one user interface event is triggered by the user's actions. When the UI mechanism receives an indication of user selection at the third position in the file, it correlates the third position with a fourth position in the topographic image, and then updates the topographic image to provide an indication that the fourth position in the topographic image is a currently selected position, which corresponds to the third position in the file. Such an indication in the topographic image may be provided by, for example, placing a crosshair at the fourth position.

In one embodiment, whenever a portion of the file is currently being rendered in the first section, the UI mechanism correlates the portion with a corresponding portion of the topographic image and updates the topographic image to provide an indication that the corresponding portion of the topographic image is currently rendered in the first section of the user interface. For example, the portion in the topographic image corresponding to the currently rendered portion of the file can be highlighted with a background pattern or color that distinguishes it from other portions of the topographic image. Thus, a user can easily correlate a portion of code with a corresponding portion in the topographic image.

The topographic image may be enhanced by reflecting thematic information relating to a theme. An example of a theme is user manipulation of the computer code in the file. A set of thematic information may comprise recently selected positions in the file. Given this set of thematic information, the UI mechanism can enhance the topographic image by correlating the recently selected positions with corresponding positions in the topographic image and updating the topographic image to indicate the corresponding positions in the topographic image using annotation elements.

Another example of a theme is the frequency of updating in the file. A set of thematic information may comprise information indicating which particular portions of the file have been frequently updated. Given this set of thematic information, the UI mechanism can enhance the topographic image by correlating the particular portions with corresponding portions of the topographic image and updating the topographic image to indicate the corresponding portions in the topographic image as being frequently updated using annotation elements.

After the topographic image is annotated with indications of thematic information, a user can select a position in the topographic image at or near an indication and navigate to a corresponding code portion in the file in the same manner as previously described.

By carrying out the above methodology, the UI mechanism makes it possible to show textual form and non-textual aspects of the file concurrently, while at the same time, making it easy for a user to navigate to specific portions of source code within the file.

DETAILED DESCRIPTION OF EMBODIMENT(S)

Operational Overview

In accordance with one embodiment of the present invention, the methodology disclosed herein is implemented by a user interface (UI) mechanism. For purposes of the present invention, the UI mechanism may be any type of UI mechanism. Examples of UI mechanisms may include but are not limited to integrated development environments (IDEs), UI modules of computer programs, and hardware components (e.g. one or more ASIC's) that render displays. To illustrate how such a UI mechanism may operate in accordance with one embodiment of the present invention, reference will be made to the sample display shown in FIG. 1, which may be rendered by the UI mechanism.

Figure 1:
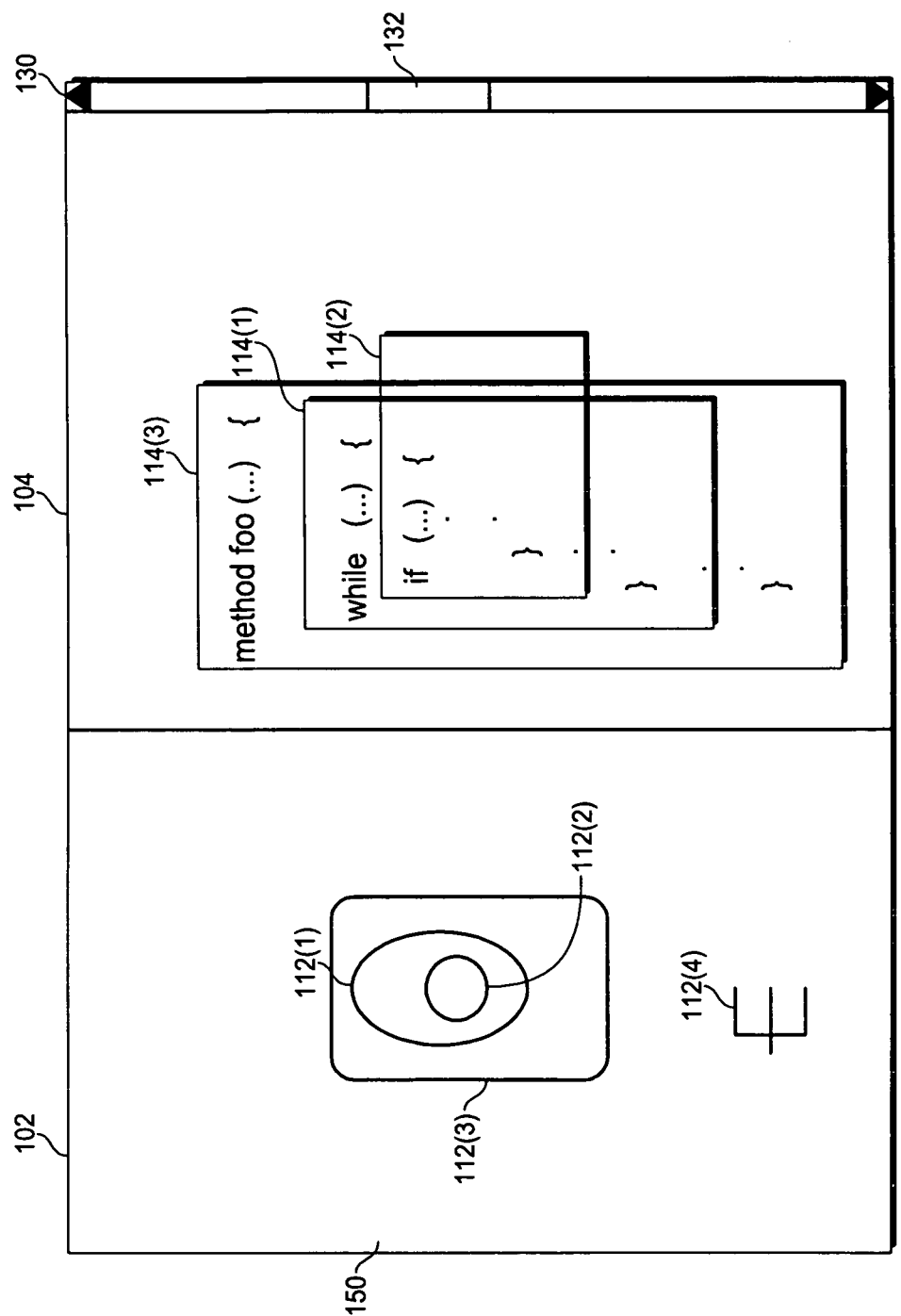
FIG. 1 shows a sample display comprising two sections that show non-textual aspects and textual form of a file, in accordance with one embodiment of the present invention.

As shown in FIG. 1, the display 100 comprises two sections 102 and 104 and a scrollbar 130 (note: only two sections and a scrollbar are shown for the sake of simplicity; for purposes of the present invention, the display 100 may comprise any desired number of other UI features). The two sections 102, 104 are rendered concurrently without overlay with each other; thus, a user can see both sections at the same time.

Section 104 shows a textual rendering of a portion of a file, which contains computer code. As used herein, the term "computer code" is any type of code that can cause a computer to perform one or more functions, and may include source code, compiled code, code that can be interpreted, executable code, etc.

Working together with section 104, scroll bar 130 allows a user to scroll up and down to see all portions of the file in section 104. As shown by the position of slider 132, section 104 is currently showing information for the portion of the file somewhere in the middle of the file. This portion of the file may include computer code. If that is the case, such computer code is rendered in a textual form which comprises code portions 114, as shown in FIG. 1.

As used herein, the term "textual form" means a form of textual rendering that displays the computer code using character representations which can perhaps be varied by, for example, font, size, color, spacing, indentation, pagination, highlighting, flashing, underlining, boldfacing, italicizing, numbering, or colored squiggly.

Unlike section 104, which in general shows only a portion of the file, section 102 shows a topographic image 150 for the file. The topographic image 150 in section 102 is automatically scaled so that, no matter how large the file is, the topographic image 150 as rendered in section 102 represents the entire file. Topographic image 150 is a representation of one or more non-textual aspects of the computer code in the file, each of the one or more non-textual aspects comprising a plurality of non-textual rendering elements 112. As used herein, the term "non-textual aspects of computer code" means aspects of the computer code other than the textual form of the computer code.

In FIG. 1, the topographic image depicts functional information pertaining to the file containing computer code. The functional information depicted, which is an example of non-textual aspects of the computer code, shows a containment relationship between various code portions in the computer code. using non-textual rendering elements 112 that correlate to code portions 114 in the file. As shown in FIG. 1, non-textual rendering element 112(1) correlates to a containing loop logic code portion 114(1); non-textual rendering element 112(2) correlates to a contained—or nested—loop logic code portion 114(2); and non-textual rendering element 112 (3) correlates to a method code portion 114(3), which implements the method foo( ). In one embodiment, one or more non-textual rendering elements 112 may overlay with one another. In the current example, the non-textual rendering elements 112 for the loops (112(1) and (2) of FIG. 1, respectively) and the method foo( ) overlay with each other because the containing loop 112(1) contains the nested loop 112(2)

and both loops are contained within the method 112(3) implementing foo( ). By graphically representing the containment relationship among the non-textual rendering elements 112 in the topographic image, a programmer is able to detect easily the functional relationships of the various code portions involved, that is, the loop logic code portion 114(1) represented by 112(1) contains another loop logic code portion 114(2) represented by 112(2) and both loop logic code portions are contained within the method code portion 114(3) implementing foo( ).

In one embodiment, vertical positions of non-textual rendering elements 112 in the topographic image scale to positions of their respective code portions 114 in the file. In the previous example, if the textual form of the loop logic is located, say, at a position about ⅖ of the length of the file, then the non-textual rendering element 112 (112(1) of FIG. 1) in section 102 will be correlatively located at a position about ⅖ of the length of section 102. However, in other embodiments, positions of non-textual rendering elements 112 may not simply be proportional to positions of corresponding code portions 114 in the file as just described. For example, a portion of the topographic image containing non-textual rendering elements which portion correlates to a portion of the file that is currently displayed in the first section may be magnified to a bigger size. Similarly, a portion of the topographic image which does not correlate to the portion of the file that is currently displayed may be shrunk to a smaller size. Furthermore, the horizontal positions of the non-textual rendering elements in the topographic image may or may not scale to horizontal positions of the corresponding code portions in the file. All variations of correlating the non-textual rendering elements in the topographic image with the code portions of the file are within the scope of the present invention.

The non-textual rendering elements 112 may be displayed in different shapes, distortions, or colors to convey more information about the computer code. For example, a loop logic code portion may be represented by a circle, as 112(1) or (2) shown in FIG. 1. A branch logic code portion (not shown) may be represented by a fork, as 112(4) in FIG. 1. A method code portion may be represented by a rounded square, as 112(3) shown in FIG. 1.

As a further example, if a loop logic code portion is implemented by a short code portion in the file, then the non-textual rendering element 112 may be shown as a distorted circle (a flattened oval in horizontal direction). If a loop logic portion is implemented by a long code portion in the file, then the non-textual rendering element 112 may be shown in another distorted circle (an elongated oval in vertical direction).

In one embodiment, visual cues associated with a color scheme are used on the topographic image to provide additional information to a programmer. For example, if a loop logic code portion contains a "break" statement, the circle representing the loop logic code portion may be colored green. If a loop logic code portion does not contain a "break" statement, the circle representing the loop logic code portion may be colored yellow. The "yellow" color warns the programmer to check the loop logic carefully to avoid a tight loop. Similarly, a flashing "red" color may be used to indicate a coding style problem where an "import" statement in Java contains a wild card character "*", for example.

Basically, the topographic image in section 102 shows non-textual aspects of computer code in a file to enable a user to discern quickly and easily the non-textual features of the computer code.

The term "topographic image" is not used in its usual sense in this specification and accompanying claims. As used herein, the term "topographic image" refers to a type of image in which rendering elements are overlaid. This overlay aspect of the image makes it easy to quickly comprehend the information presented and is one of the advantages of this invention. This term is used because the image in section 102 starts looking like a topographic map when the file it represents gets bigger and the amount of information being presented in the image becomes larger.

As noted previously, sections 102 and 104 are rendered concurrently without overlay with each other; a user is thus able to see both non-textual aspects of a file and a textual form of a portion of the file at the same time.

Given that each section 102 or 104 shows a plurality of elements 112 or 114, it may be difficult for a user to determine, by just looking at the elements, which element 112 in section 102 correlates to which code portion 114 in section 104. To solve this problem, one embodiment of the UI mechanism provides additional indicia to make this correlation self evident.

To illustrate how this may be done, reference will be made to FIG. 2. Suppose that a user positions a cursor 202 on element 112(1) of section 102. This may be done, for example, by moving a mouse until the mouse cursor is over element 112(1). When this user interface event (commonly referred to as a "mouseover") is detected by the UI mechanism, the UI mechanism alters the appearance of element 112(1). Additionally or alternatively, the UI mechanism displays a tooltip 142(1) near element 112(1). In the example shown in FIG. 2, the appearance of element 112(1) is altered to indicate that it is selectable by a mouse click, and a tooltip is displayed near element 112(1) to indicate "loop . . . in method foo( )." In response to a mouse click on the selectable appearance of element 112(1), the UI mechanism also determines which code portion 114 in section 104 correlates to element 112(1) in section 102, and alters the appearance of that section. In the example shown in FIG. 2, code portion 114(1) correlates to element 112(1); thus, the UI mechanism highlights code portion 114(1) as well. In some embodiments, a caret 154 is inserted in a position in section 104 which position correlates to the mouse cursor position in section 102. User may edit the file at the position where the caret is inserted. By doing this, the UI mechanism makes it evident to a user that elements 112(1) shows information pertaining to the code portion 114(1) and that a mouse cursor position in section 102 correlates to a current edit position in section 104. Thus, a user can easily determine which set of information in section 102 correlates to which set of information in section 104.

As noted, in some situations, elements 112 may overlay each other. In the example shown, element 112(1) may overlay with element 112(2). In such situations, the UI mechanism provides a way to select one of the overlaid elements based on some criteria including, but not limited to, proximity to the mouse cursor or a fairness algorithm (for example, round-robin every two seconds) to provide overlaid elements an opportunity to be selected in a mouseover event.

Figure 3:
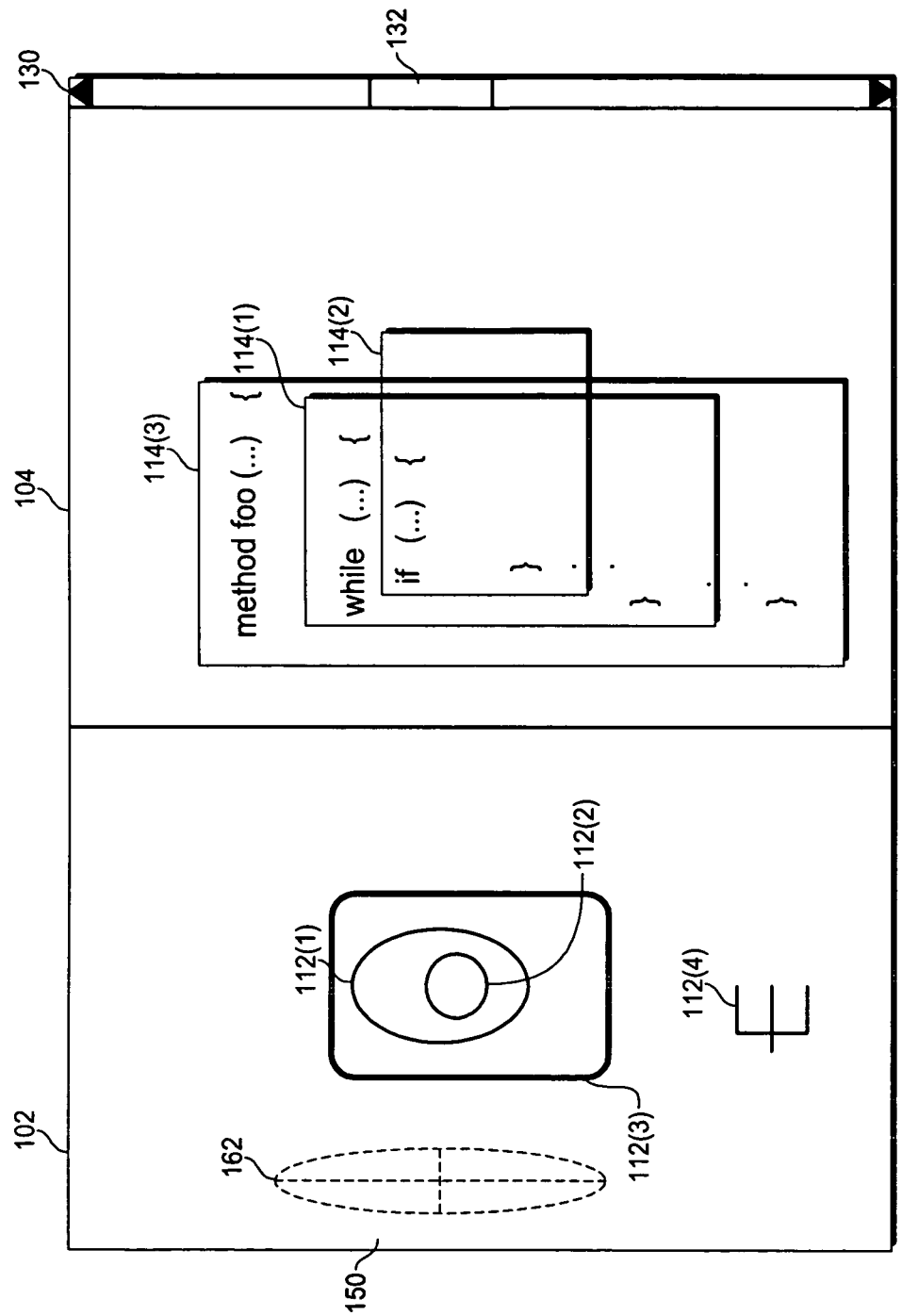
FIG. 3 shows the sample display of FIG. 1 after a user has moved a mouse cursor over another one of the sections of the display.

In one embodiment, this correlation works in either direction. To illustrate this, suppose that a user places the mouse cursor 202 over code portion 114(1) of section 104 (as shown in FIG. 3) instead of element 112(1) of section 102. When this user interface event is detected by the UI mechanism, the UI mechanism alters the appearance of code portion 114(1). In the example shown, the appearance is altered by highlighting code portion 114(1). In addition to doing this, the UI mechanism also determines which element 112 in section 102 correlates to code portion 114(1), and alters the appearance of that element 112. In the example shown in FIG. 3, element 112(1) correlates to code portion 114(1); thus, the UI mechanism highlights element 112(1) as well. In some embodiments, the UI mechanism provides a crosshair 162 to indicate an intersected position in section 102 which intersected position correlates to the current position of the mouse cursor in section 104. In some other embodiments, the UI mechanism provides a crosshair 162 to indicate an intersected position in section 102 which intersected position corresponds to the current position in section 104 where an editing operation may be made (not shown). As this example shows, regardless of the section in which the user interface event is detected, the same result is derived: the appearance of both elements 112(1) and 114(1) is changed and additional means may be used to correlate these elements located in different sections of the user interface.

In some situations, code portion 114(1) may belong to a code portion which contains two or more code portions 114. In some embodiments, in such situations, the UI mechanism provides that a specific code portion 114(1) which correlates to a non-textual rendering element 112(1) can be identified by placing the mouse cursor 202 over a specific keyword which relates to the code portion 114(1). In the example shown, code portion 114(1) correlates to a non-textual rendering element 112(1) indicating a loop logic. In a situation where the code portion 114(1) contains both a containing loop logic and a contained (nested) loop logic, code portion 114(1) can be identified by placing a mouse cursor 202 over a outer "while" keyword, if the outer "while" keyword relates to the code portion 114(1). On the other hand, in the same code portion, the code portion 114(2) which relates to the contained loop logic can be identified by placing a mouse cursor 202 over an inner "while" keyword, if such keyword relates to 114(2).

Figure 10:
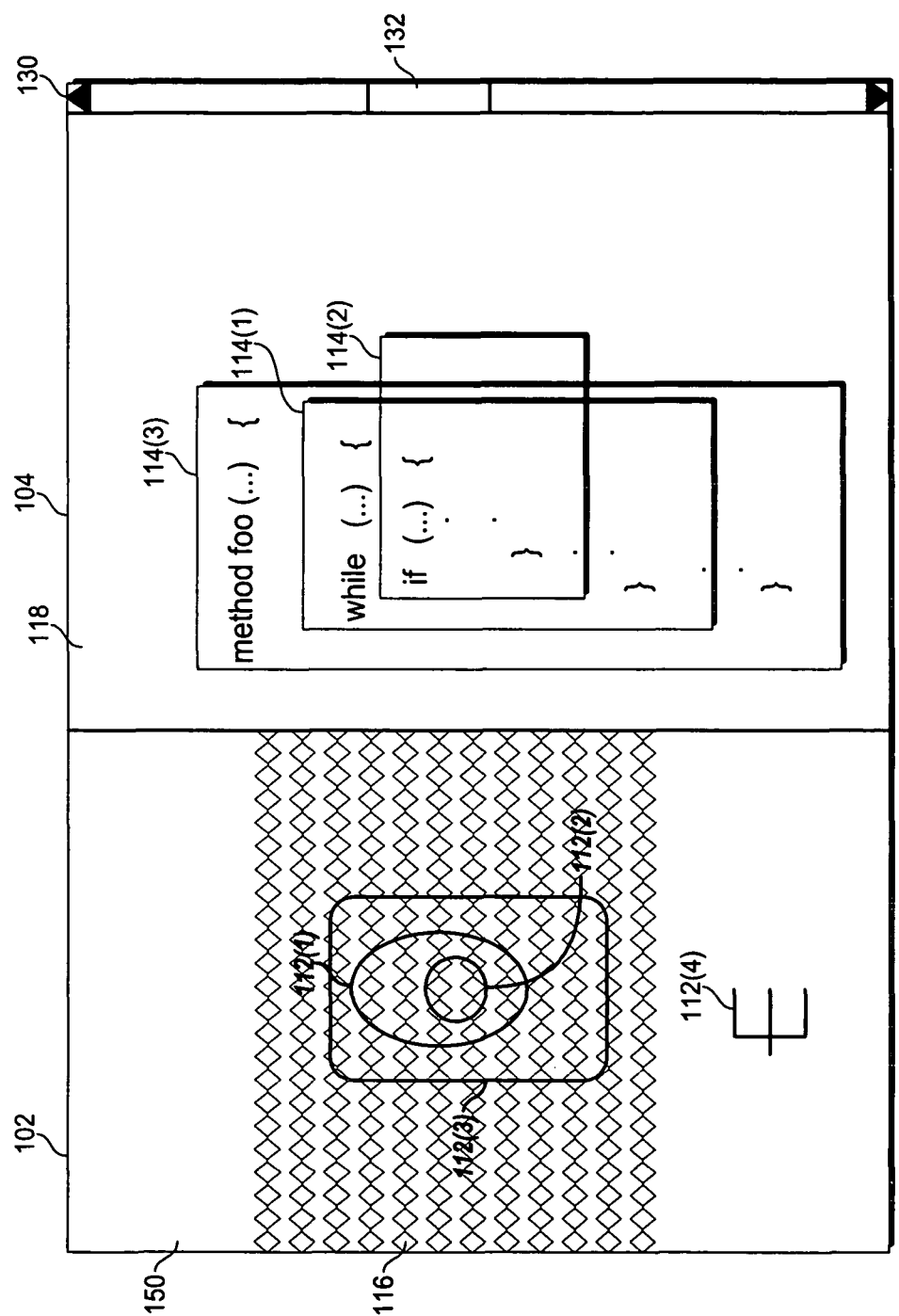
FIG. 10 shows the sample display of FIG. 1, where a portion of a file displayed in a section in textual form is indicated in a topographic image displayed in another section.

In one embodiment, when a portion of a file is displayed in section 104, the UI mechanism provides an indication to the corresponding portion of the topographic image in section 102. To illustrate this, suppose that a portion of the file is currently displayed in section 104. This display can be rendered by the UI mechanism in response to a user interface event, for example, a mouseclick event on scrollbar 130. This display can also be rendered by the UI mechanism in response to a file open action by a user. When this user interface event or user action is detected by the UI mechanism, the UI mechanism renders a portion of the file in section 104. In addition to doing this, the UI mechanism also determines which portion of the topographic image in section 102 correlates to the portion of the file, and alters the appearance of that portion of the topographic image. In the example shown in FIG. 10, file portion 118 correlates to image portion 116. The UI mechanism uses a different fill pattern for portion 116 and distinguishes it from the fill pattern related to the rest of the topographic image.

In an embodiment, when non-textual rendering elements 112 have functional relationships amongst themselves, the UI mechanism renders a representation of the functional relationships in section 102. As used herein, the term "functional relationship" means a logical connection between two or more non-textual rendering elements. To illustrate this, in the previous example, the functional relationship between a containing loop logic and a contained loop logic is a containment relationship. In detecting the containment relationship, the UI mechanism renders the element 112 representing the contained loop logic inside the element 112 representing the containing loop logic. In the example shown in FIG. 3, the contained element 112(2) represents the contained loop logic while the containing element 112(1) represents the containing loop logic.

In the above example, only two sections 102, 104 and a scrollbar 130 accompanying section 104 are shown for the sake of simplicity. However, it should be noted that the methodology disclosed herein may be applied to any n number of sections and any m number of scrollbar accompanying some of the sections, where n is an integer greater than 1 and m is an integer greater than 0. Thus, if a display has 5 sections for example, and each section shows a subset of information pertaining to a file, then the detection of a user interface event on any of the particular sections in any of the 5 portions would cause the appearance of all of the particular sections in all of the 5 portions to change, if the display is configured to do so. That way, by initiating a user interface event on any one section pertaining to a file, a user can see which sections in all of the other sections contain information pertaining to that file.

As shown in FIG. 3, scroll bar 130 can be moved; thus, the information visible in the different sections 102 and 104 may not be synchronized. For example, a non-textual aspect of a code portion can be seen in element 112(4) of section 102; however, the code portion 114(4) of the same code portion is not currently visible in section 104. Because of this, if a user interface event is detected on element 112(4), nothing is changed in section 104 because the section showing the textual form for the code portion is not currently visible.

Figure 4:
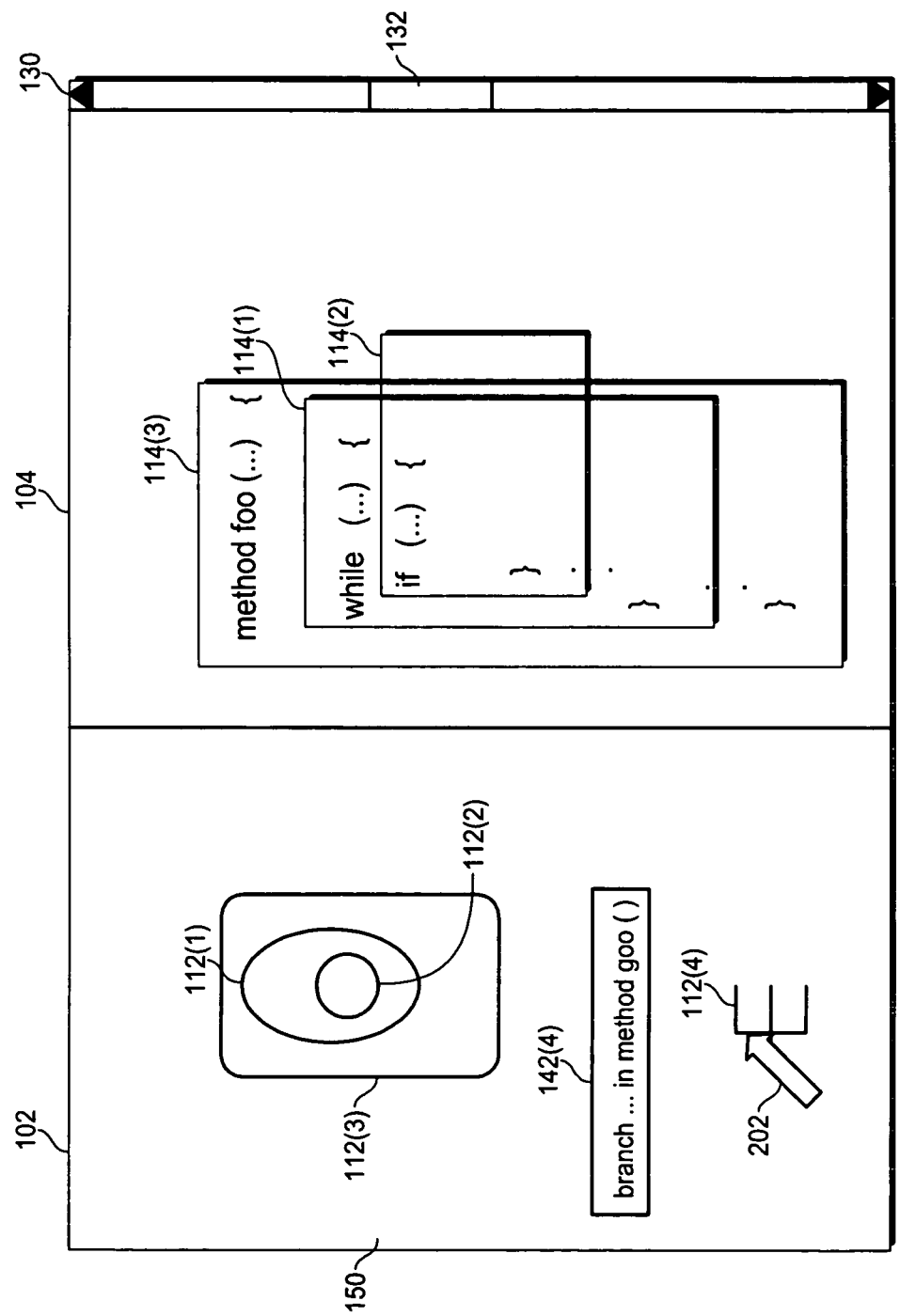
FIG. 4 shows the sample display of FIG. 1 after a user has moved a mouse cursor over yet another one of the sections of the display.
Figure 5:
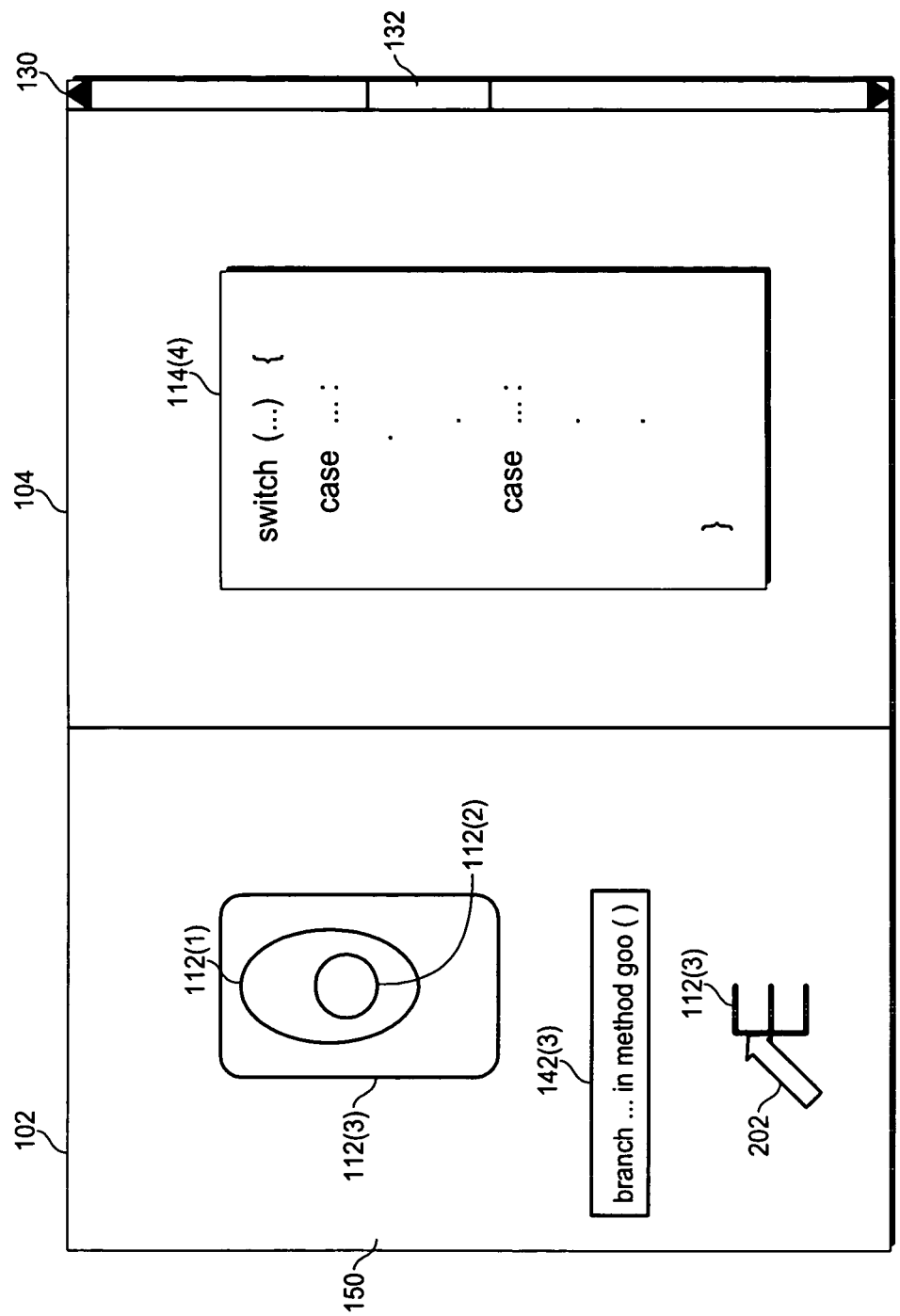
FIG. 5 shows the sample display of FIG. 4 after a section of the display has scrolled in response to a user interface event being detected in the other section of the display.

In one embodiment, the UI mechanism can be configured to cure this situation by determining whether a code portion 114 relating to an element 112 is currently visible in section 104 of the display. If it is not, then the UI mechanism scrolls to a portion of the file which contains that element, and then changes the appearance of that section. To illustrate, suppose that a user does a mouseover on element 112(4) of FIG. 3. In response to this user interface event, the UI mechanism changes the appearance of element 112(4) (as shown in FIG. 4, element 112(4) is highlighted as the heavy line indicates) to indicate that it is selectable. Suppose further that the user does select 112(4) by clicking a mouse button. In response to this user interface event, the UI mechanism determines: (1) which code portion 114 in section 104 correlates to element 112(4); and (2) whether that section is currently visible in section 104. In FIG. 4, the code portion 114 in section 104 that correlates to element 112(4) is not currently visible; thus, the UI mechanism scrolls section 104 until the code portion 114(4) that correlates to element 112(4) is visible (the result is shown in FIG. 5; note the new position of the slider 132). Once that is done, the UI mechanism changes the appearance of code portion 114(4) by highlighting it, as shown. In this manner, the UI mechanism ensures that the correlating section is visible, and changes the appearance thereof.

Figure 11:
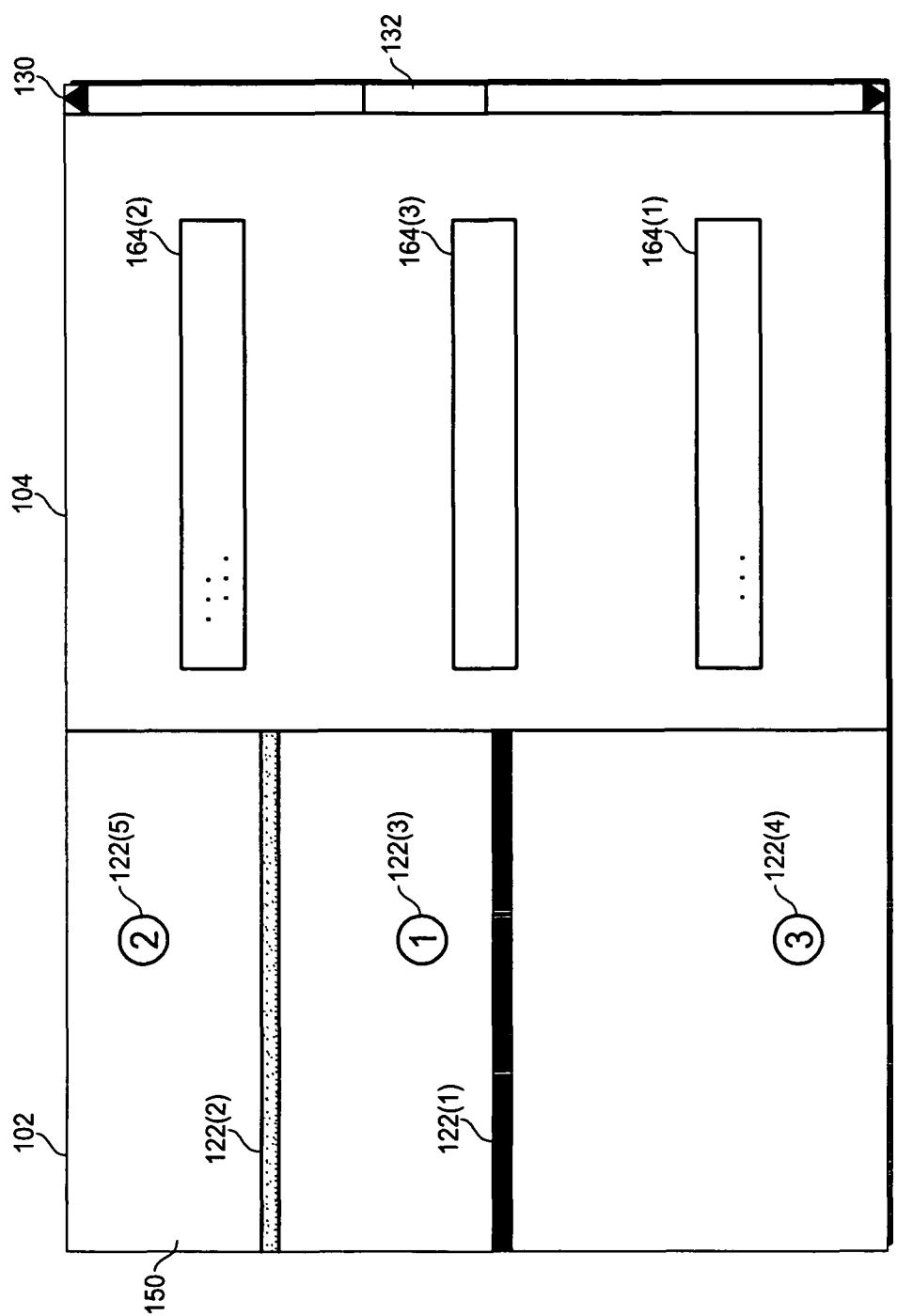
FIG. 11 shows a sample display where two types of thematic information elements in a file are indicated in a topographic image by two types of annotation elements.

Very often, detailed history information of updating performed on a file containing computer code is kept. Such detailed history information of updating performed on a file constitutes a type of thematic information. As used herein, the term "thematic information" means information associated with a common theme. In the present example as illustrated by FIG. 11, the common theme is updating performed on a file and each record of updating in the history of updating constitutes a thematic information element 124. In an embodiment, the UI mechanism displays annotation elements 122 on the topographic image to indicate the presence of thematic information in the correlated position in the file. In the present example, the UI mechanism displays annotation elements 122 by using color bands in a gradient color scheme. As shown in FIG. 11, a darker colored band in the topographic image in section 102 is annotation element 122(1), which indicates that its correlated code portion (thematic information element 164(1) in FIG. 11) in the file experiences more frequent updating while a lighter colored band in the topographic image in section 102 is annotation element 122(2), which indicates that its correlated code portion (thematic information element 164(2)) in the file experiences less frequent updating.

Another type of thematic information is a history of selected positions generated by a user in a file editing session. For example, a user may have selected a number of positions in a file and made a number of editing operations in the file editing session. In the present example, the common theme is editing operations on a file and each position record constitutes a thematic information element 164. In an embodiment, the UI mechanism displays annotation elements 122 on the topographic image to indicate selected positions generated by a user in a file editing session. In the present example, the UI mechanism displays annotation elements 122 by using numbered marks. As shown in FIG. 11, a numbered mark in the topographic image in section 102 is annotation element 122(3), which indicates that its correlated code portion in the file contains a selected position. As showing in FIG. 11, those selected positions selected (not necessarily edited) are annotated in the topographic image in section 102 in the order of selection (marks 122(3)-(5)). In this example, thematic information elements 164(4) and (5) are displayed in section 104 because they are located in portions of the file that are not currently displayed in section 104. In one embodiment, wall clock times and durations spent on each of the selected positions by the user can be displayed in a tooltip when a user mouse-over to each mark or annotation element relating to the editing theme.

To illustrate annotations of a topographic image with thematic information, histories of file updating and selected positions are used as examples. However, types of thematic information needs not be so limited. For example, a "TODO" list embedded in the source code comments may be a type of thematic information. Annotations of topographic images can be made to indicate position of a "TODO" item in a file. Similarly, bookmarks generated by a user in a file may be a type of thematic information. Annotations of topographic images can be made to indicate position of bookmarks in a file. Annotation of a particular set of thematic information on a topographic image can be made optional. In addition, one or more sets of thematic information can optionally be displayed at the same time.

In some situations, since elements rendered in the topographic image may be overlaid, the topographic image may contain elements that are not rendered with sufficient resolution. In one embodiment, the UI mechanism can be configured with a magnifier that can display the detail of a particular portion on the topographic image. For example, the UI mechanism can be configured to respond to a mouseover event in a portion of the topographic image. In response to such a mouseover event, a magnifier view pops up to show a more detailed rendering of the portion.

In some embodiments, section 102 may be hidden and only an icon of a drawer with handle is shown. When a user places a mouse on the handle and clicks a mouse button, the UI mechanism detects the mouse click event on the handle, makes section 102 visible and renders a topographic image in section 102.

Thus far, the changing of the appearance of an element has been described as involving the highlighting of the element. It should be noted that this is for illustrative purposes only. For purposes of the present invention, the appearance of an element may be changed in any desired manner. For example, the appearance of an element may be changed by changing the background or foreground color of the element, by drawing an asterisk on the element, etc. All possible manners of changing the appearance of an element are within the scope of the present invention.

Also, with regard to user interface events and user actions, only the mouseover and mouseclick events and the file open action have been discussed. It should be noted, though, that the present invention is not limited to detecting such events or actions. To the contrary, the appearance of an element may be altered in response to the detection of any type of user interface event or actions. Similarly, the selection of an element may be made in response to the detection of any other type of user interface events and actions. These may include but certainly are not limited to cursor events (e.g. a mouseover, cursor movement using arrow navigation keys, etc.), selection events (e.g. selecting a certain section with a single mouse click or an arrow navigation button on a keyboard, etc.), double mouse clicks, etc. These and all other events and actions (including events and actions that do not alter any of the data or information in any of the elements) may be detected by the UI mechanism, and may cause the appearance of one or more elements to change, or the selection of one or more elements. Thus, all user interface events and actions are within the scope of the present invention.

The topographic image here has been described as containing rendering and annotation elements. It should be noted that this is for illustrative purposes only. For purposes of the present invention, other information elements can also appear in the topographic image. For example, textual form of the file containing computer code may be overlaid with other type of elements in the topographic image. Thus, rendering of non-textual aspects of the computer code and other information on the topographic image is within the scope of the present invention.

Sample Implementation

To facilitate a complete understanding of the present invention, a specific sample implementation of the UI mechanism will now be described. It should be noted that this sample implementation is provided for illustrative purposes only. It is not meant to be limiting or definitive. Many other implementations are possible and are within the scope of the present invention. In the following discussion, it will be assumed that the UI mechanism is an integrated development environment (IDE). It will also be assumed that the IDE reads a file containing computer code from an accessible file storage location which file, when rendered, gives rise to the display 100 shown in FIGS. 1-5, 10 and 11.

Figure 6:
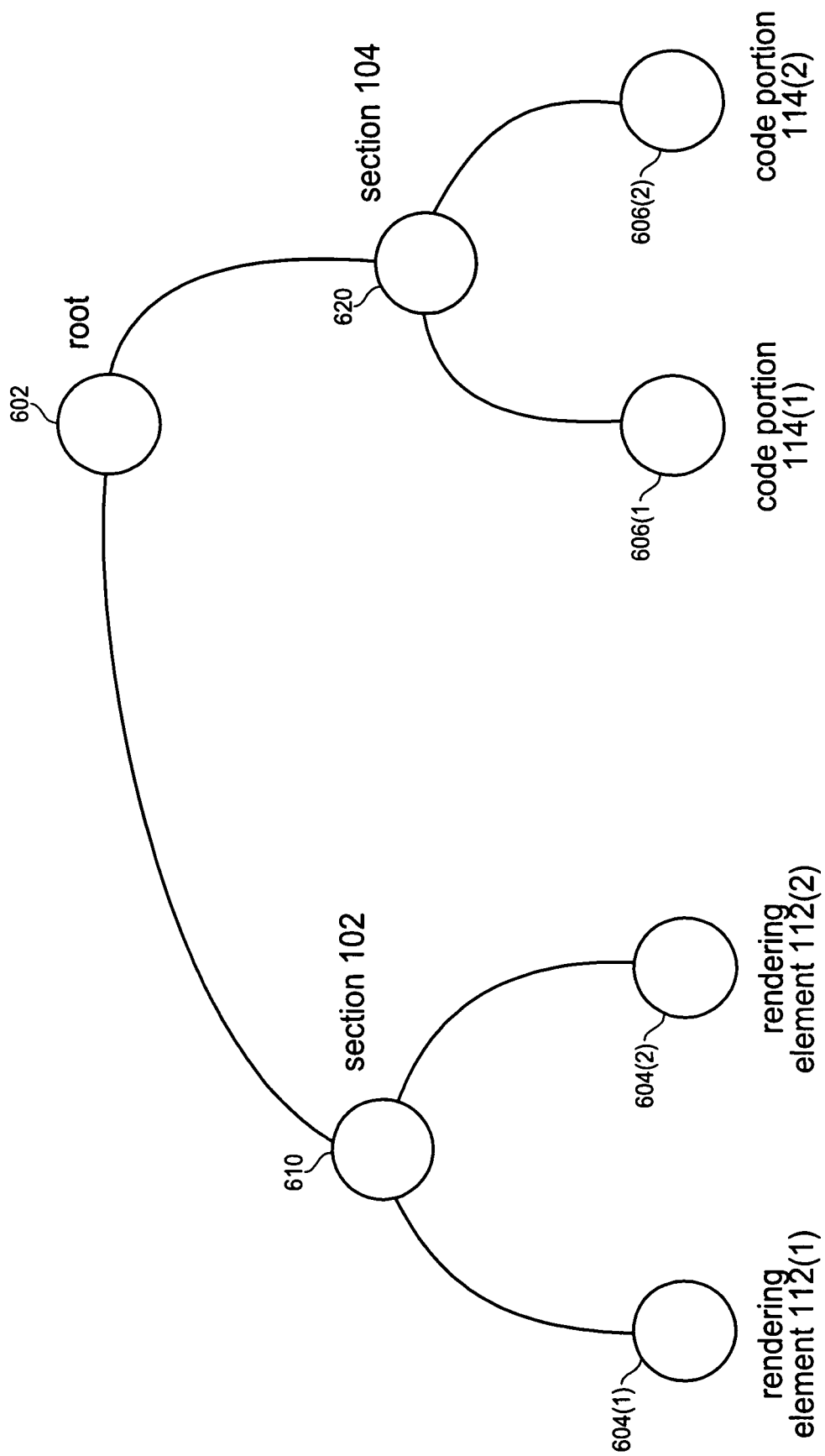
FIG. 6 shows a sample tree structure constructed by a IDE.

In one embodiment, the content of the file containing computer code is in ASCII format. Included with this textual (in ASCII) content is source code, written in Java in one embodiment. In one embodiment, the IDE contains a UI mechanism implementing the appearance altering aspect of the present invention. Upon receiving this Java source code, the IDE parses the Java code and creates a tree structure representation. A sample tree structure representation is shown in FIG. 6.

As shown, the tree structure comprises a root node 602. In one embodiment, the textual content of the file and positional information for the portion of the file displayed in section 104 resides at the root node 602 level.

The tree structure also comprises two main branches. The left main branch goes to a node 610 that represents the topographic image in section 102 of the display. The right main branch goes to a node 620 that represents the file. In one embodiment, the IDE can access the nodes 610 and 620 and their respective child nodes by traversing the tree structure, or by some other means. All such means are within the scope of the present invention.

Node 610 has a plurality of nodes 604 (child nodes) that branch from it. These nodes 604 represent the various rendering elements 112 that are shown within section 102 of the display. For example, node 604(1) represents the rendering element 112(1), node 604(2) represents the rendering element 112(2), and so on. Similarly, node 620 has a plurality of nodes 606 that branch from it. These nodes 606 represent the various code portions 114 in the file. For example, node 606(1) represents the code portion 114(1), node 606(2) represents the code portion 114(2), and so on. In one embodiment, each node in the tree structure takes the form of one or more objects. Those objects contain all of the information for that node. As will be described in a later section, this information is used by the IDE in responding to user interface events.

Figure 7:
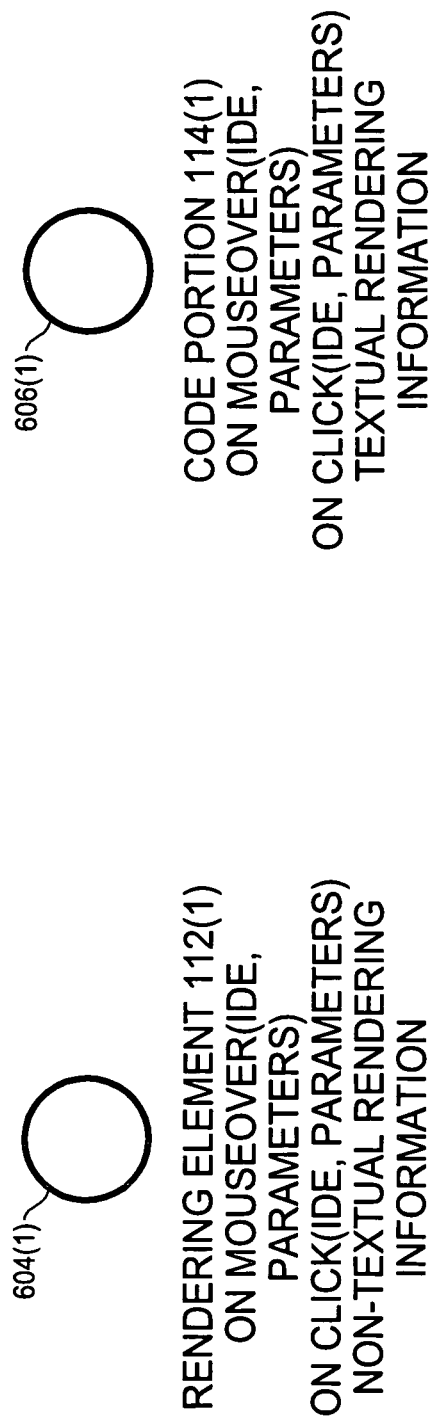
FIG. 7 shows in greater detail the contents of two of the nodes in FIG. 6.

To illustrate what information may be associated with each node 604, 606, reference will be made to the example shown in FIG. 7. For the sake of simplicity, FIG. 7 shows the information for just two of the nodes: node 604(1) and node 606(1). However, it should be noted that the other nodes 604, 606 may contain similar information.

As shown in FIG. 7, information in node 604(1) may include an object ID that allows the node 604(1) to be uniquely identified by the IDE. In one embodiment, this ID comprises a base ID and an extension. If, for example, the base ID is X, and the extension is 1, then the overall object ID may be X.1. In addition to the ID, the node 604(1) may also contain information that specifies what should be done in response to certain user interface events. In the example shown in FIG. 7, there is information that specifies what should be done in response to a mouseover event and a click event (e.g. a single click of a mouse). According to the information shown, in response to either of these events, the IDE is to be invoked. As part of this invocation, several parameters are passed. In one embodiment, these parameters include the base ID of the object 604(1) and the type of the user interface event (e.g. mouseover or click). The invocation and the operation of the IDE will be discussed further in a later section. In addition to the information already discussed, the node 604(1) further comprises some information pertaining to the rendering element 112(1), for example, a functional relationship such as containment relationship with one or more other rendering elements 112. Other information may also be included in node 604(1), if so desired.

Like node 604(1), information in node 606(1) may include an object ID that allows the node 606(1) to be uniquely identified by the IDE. This ID comprises a base ID and an extension. In one embodiment, because nodes 606(1) and 604(1) both contain information pertaining to the same code portion 1, they share the same base ID. Thus, if the base ID is X, then both nodes 604(1), 606(1) would have an ID that starts with X. Their extensions would be different, however (for example, node 604(1) may have 1 as the extension while node 606(1) may have 2 as the extension). Thus, the ID for node 604(1) may be X.1, while the ID for node 606(1) may be X.2. With these ID's, it is easy to determine, based upon the base ID, that the two nodes correlate to each other (contain information pertaining to the same code portion), while at the same time, giving a unique ID to each node. Under this scheme, nodes 604(1) and 606(1) (FIG. 6), would share a common base ID (since they both contain information pertaining to the same code portion 1), nodes 604(2) and 606(2) would share a common base ID, and so forth. In addition to the ID, the node 604(1) may also contain information that specifies what should be done in response to certain user interface events. In the example shown in FIG. 7, there is information that specifies what should be done in response to a mouseover event and a click event (e.g. a single click of a mouse). In addition to the information already discussed, the node 606(1) further comprises some information pertaining to code portion 114(1). Other information may also be included in node 606(1), if so desired.

The tree structure here has been described as containing branches and nodes that describe the rendering elements and code portions. It should be noted that this is for illustrative purposes only. For purposes of the present invention, the same tree structure, or a separate tree structure, can also be used to describe, for example, annotation and thematic information elements in a similar manner. Thus, use of a tree structure to describe annotation and thematic information elements is also within the scope of the present invention.

Sample Operation

Figure 8:
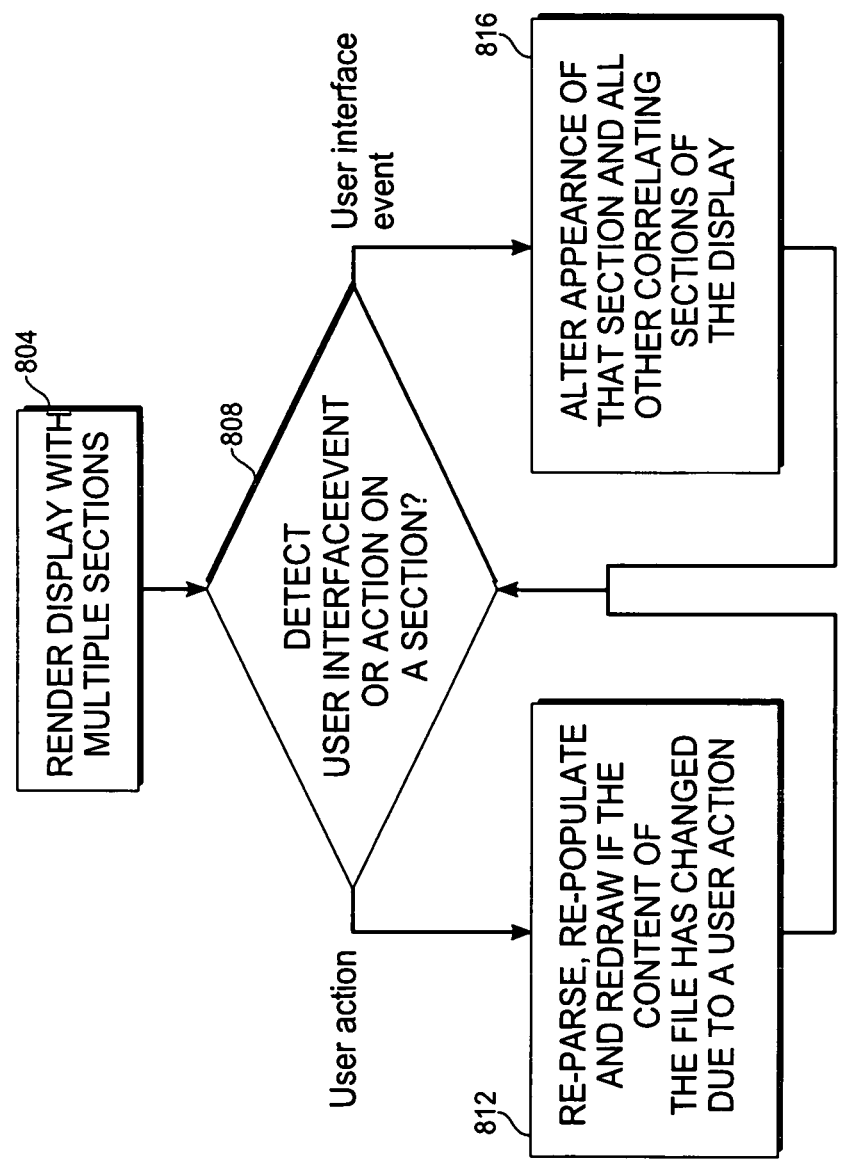
FIG. 8 is a high level flow diagram of one embodiment of the methodology of the present invention.

After parsing the Java source code and constructing the tree structure shown in FIG. 6, the IDE is ready to implement the methodology of one embodiment of the present invention. A flow diagram which provides a high level overview of the methodology is shown in FIG. 8.

Initially, the IDE renders (block 804 of FIG. 8) the display. To do so, the IDE uses the information in the tree structure (FIG. 6). Specifically, from the two nodes 610, 620, the IDE knows that it is to construct two sections for the display. In one embodiment, the two sections 102, 104 are rendered using two different frames. The two section 102, 104 are rendered side by side without overlay so that a user can see both sections 102, 104 at the same time, as shown in FIG. 1. After constructing the sections 102, 104, the IDE populates them with the information contained in nodes 604 and 606 to give rise to the elements 112, 114. Specifically, using the non-textual aspect information in nodes 604, the IDE renders elements 112 in section 102. For example, using the loop logic information in node 604(1), the IDE renders element 112(1). Similarly, using the textual information in a node 606, the IDE can render a portion of the file containing code portion 114 in section 104 if the code portion 114 should be made visible in section 104. To determine whether an code portion 114 should be made visible, the DE checks, based on the information in the root node 602, whether a part or whole of code portion 114 falls within the current portion of the file in section 104. In populating section 104, the IDE may not be able to fit all portions of the file into the section. In such a case, the IDE may render a scroll bar 130.

After the display is rendered, the IDE is ready to detect (block 808 of FIG. 8) user interface events and user actions. Suppose, for the sake of example, that the IDE detects a user action that a user has edited the file. In response to this user action, the IDE may immediately re-parse the content of the file as edited, re-populate the tree structure that describes various elements and redraw the display (block 812 of FIG. 8). Alternatively, the IDE may set a timer and perform the re-parsing, re-populating and redrawing at a later time (not shown).

Figure 2:
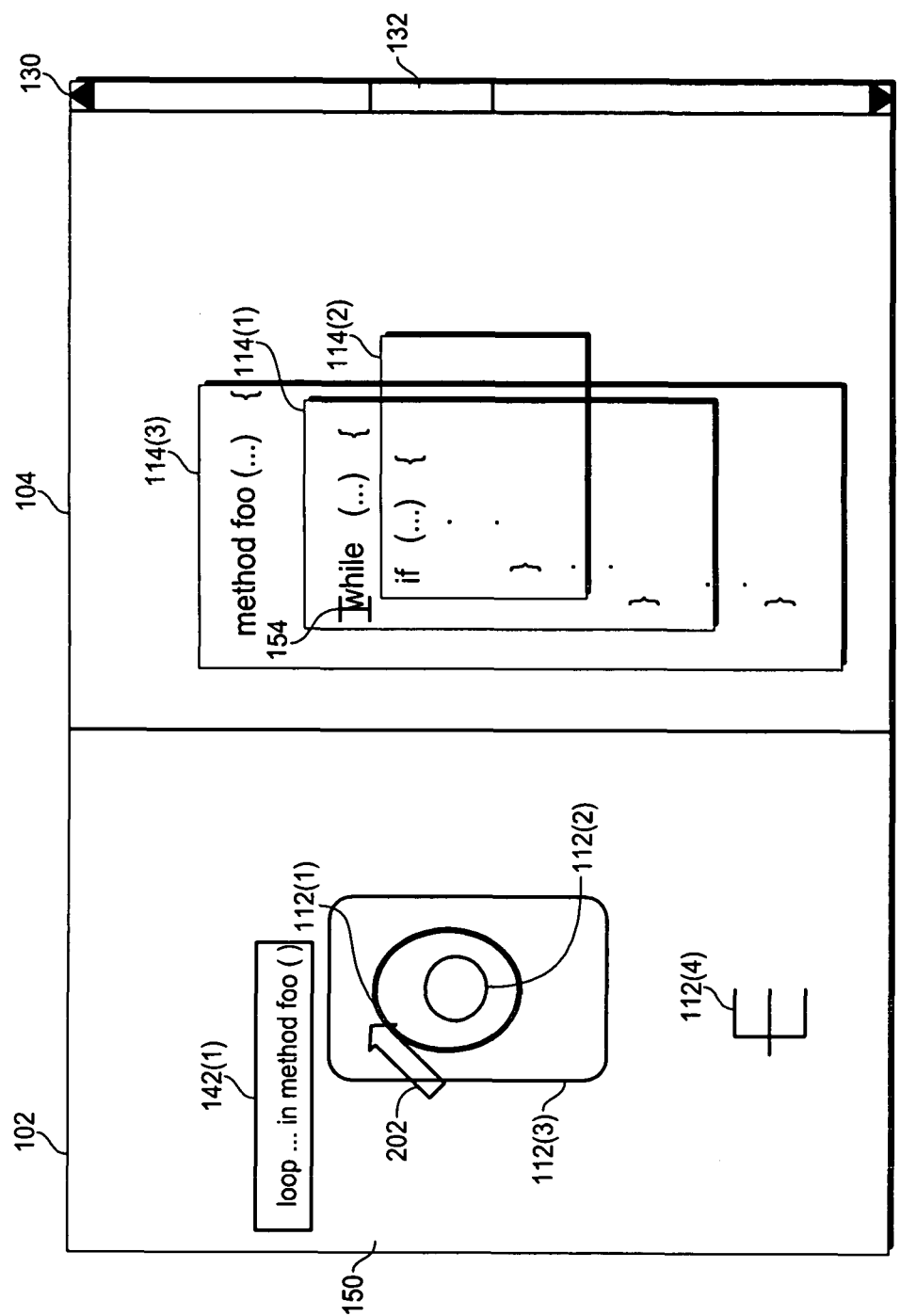
FIG. 2 shows the sample display of FIG. 1 after a user has moved a mouse cursor over one of the sections of the display.

Now suppose, for the sake of example, that the IDE detects a mouseover event on element 112(4) of section 102, as shown in FIG. 2. In response to this event, the IDE accesses the node that corresponds to the element 112(1) on which the event was detected. In this example, that node is node 604(1) (FIG. 7). After accessing the node 604(1), the IDE determines whether anything should be done in response to a mouseover event. The IDE looks at the type of user interface event that was detected. Depending upon the type of event, the IDE may behave differently. For example, in response to a mouseover event, the IDE may change the appearance of a section by d a highlighting the element. In response to a mouse click, the IDE may change the background color of the element instead. Whatever the case, the IDE contains logic that knows what to do in response to each type of user interface event. After determining the type of user interface event, the IDE uses the base ID (X in the current example) to find all of the nodes that it should act upon. In one embodiment, to do so, the IDE searches the tree structure for all of the objects that have X as their base ID. In the current example, that would be nodes 604(1) and 606(1). These nodes 604(1), 606(1) correspond to element 112(1) of section 102 and code portion 114(1) of section 104, respectively.

In some embodiments, after determining which nodes it should act upon, the IDE determines whether the code portions 114 that correspond to the nodes 606 are currently visible in their respective portions. If they are not, then the IDE scrolls the portions sufficiently to render the sections visible. Once that is done, the IDE alters (block 816 of FIG. 8) the appearance of the sections. In the current example, as a result, the IDE highlights elements 112(1) and 114(1), as shown in FIG. 2. In this manner, the appearance of both elements 112(1), 114(1) is altered even though a user interface event was detected in only one of the sections. Notice that the result would have been similar if the mouseover had been detected on code portion 114(1) instead of element 112(1). The IDE still would have been invoked, and the same base ID would have been provided. After the IDE alters the appearance of the elements 112(1), 112(1) in the manner described, the IDE waits for other user interface events or actions.

Hardware Overview

Figure 9:
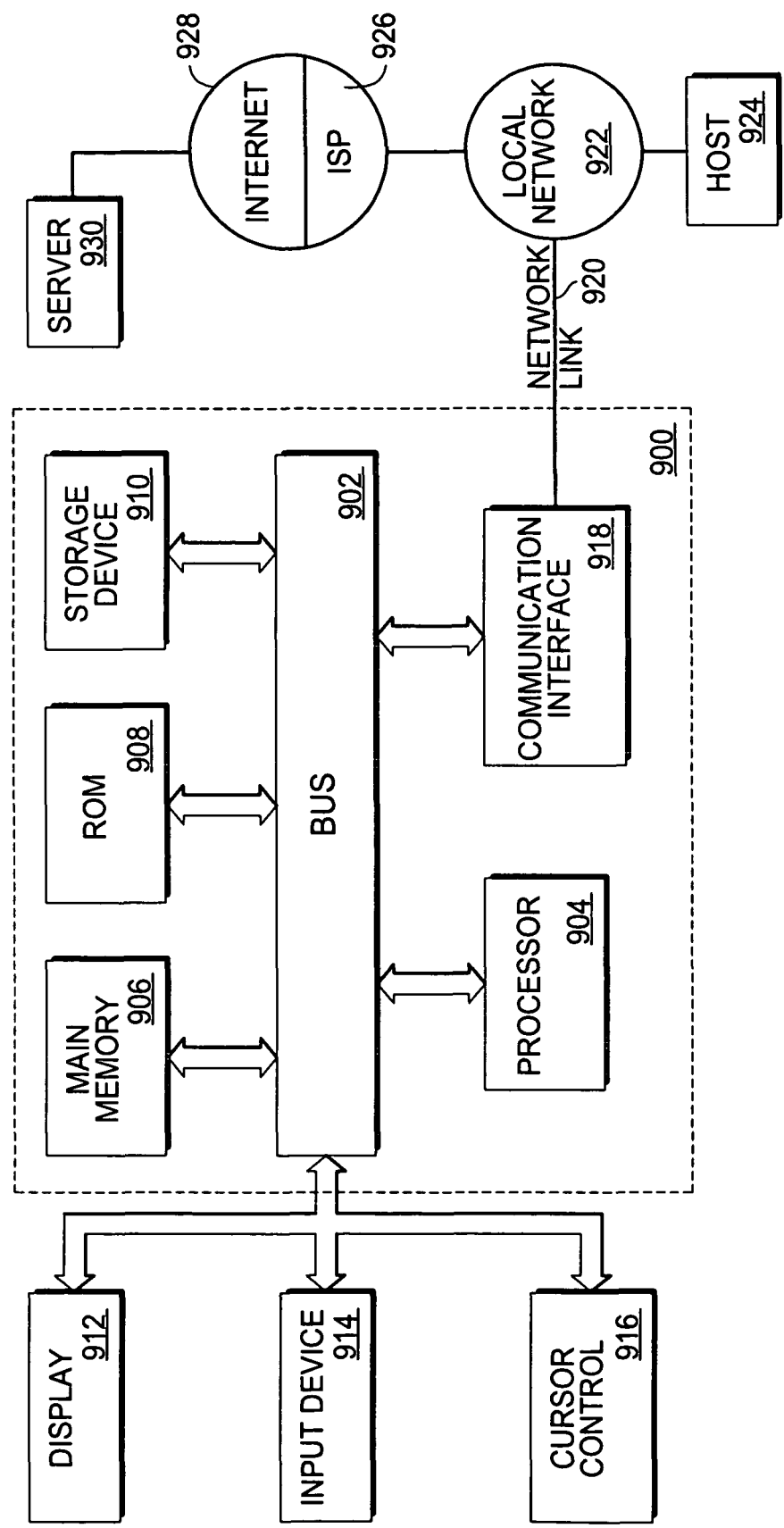
FIG. 9 is a block diagram of a general purpose computer system in which one embodiment of the present invention may be implemented.

In one embodiment, the UI mechanism takes the form of a set of instructions that are executed by one or more processors. FIG. 9 is a block diagram of a computer system 900 upon which an embodiment of the UI mechanism may be executed. Computer system 900 includes a bus 902 for facilitating information exchange, and one or more processors 904 coupled with bus 902 for processing information. Computer system 900 also includes a main memory 906, such as a random access memory (RAM) or other dynamic storage device, coupled to bus 902 for storing information and instructions to be executed by processor 904. Main memory 906 also may be used for storing temporary variables or other intermediate information during execution of instructions by processor 904. Computer system 900 may further include a read only memory (ROM) 908 or other static storage device coupled to bus 902 for storing static information and instructions for processor 904. A storage device 910, such as a magnetic disk or optical disk, is provided and coupled to bus 902 for storing information and instructions.

Computer system 900 may be coupled via bus 902 to a display 912 for displaying information to a computer user. An input device 914, including alphanumeric and other keys, is coupled to bus 902 for communicating information and command selections to processor 904. Another type of user input device is cursor control 916, such as a mouse, a trackball, or cursor direction keys for communicating direction information and command selections to processor 904 and for controlling cursor movement on display 912. This input device typically has two degrees of freedom in two axes, a first axis (e.g., x) and a second axis (e.g., y), that allows the device to specify positions in a plane.

In computer system 900, bus 902 may be any mechanism and/or medium that enables information, signals, data, etc., to be exchanged between the various components. For example, bus 902 may be a set of conductors that carries electrical signals. Bus 902 may also be a wireless medium (e.g. air) that carries wireless signals between one or more of the components. Bus 902 may further be a network connection that connects one or more of the components. Any mechanism and/or medium that enables information, signals, data, etc., to be exchanged between the various components may be used as bus 902.

Bus 902 may also be a combination of these mechanisms/media. For example, processor 904 may communicate with storage device 910 wirelessly. In such a case, the bus 902, from the standpoint of processor 904 and storage device 910, would be a wireless medium, such as air. Further, processor 904 may communicate with ROM 908 capacitively. Further, processor 904 may communicate with main memory 906 via a network connection. In this case, the bus 902 would be the network connection. Further, processor 904 may communicate with display 912 via a set of conductors. In this instance, the bus 902 would be the set of conductors. Thus, depending upon how the various components communicate with each other, bus 902 may take on different forms. Bus 902, as shown in FIG. 9, functionally represents all of the mechanisms and/or media that enable information, signals, data, etc., to be exchanged between the various components.

The invention is related to the use of computer system 900 for implementing the techniques described herein. According to one embodiment of the invention, those techniques are performed by computer system 900 in response to processor 904 executing one or more sequences of one or more instructions contained in main memory 906. Such instructions may be read into main memory 906 from another machine-readable medium, such as storage device 910. Execution of the sequences of instructions contained in main memory 906 causes processor 904 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 900, various machine-readable media are involved, for example, in providing instructions to processor 904 for execution. Such a medium may take many forms, including but not limited to, non-volatile media, volatile media, and transmission media. Non-volatile media includes, for example, optical or magnetic disks, such as storage device 910. Volatile media includes dynamic memory, such as main memory 906. Transmission media includes coaxial cables, copper wire and fiber optics, including the wires that comprise bus 902. Transmission media can also take the form of acoustic or light waves, such as those generated during radio-wave and infra-red data communications.

Common forms of machine-readable media include, for example, a floppy disk, a flexible disk, hard disk, magnetic tape, or any other magnetic medium, a CD-ROM, DVD, or any other optical storage medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 904 for execution. For example, the instructions may initially be carried on a magnetic disk of a remote computer. The remote computer can load the instructions into its dynamic memory and send the instructions over a telephone line using a modem. A modem local to computer system 900 can receive the data on the telephone line and use an infra-red transmitter to convert the data to an infra-red signal. An infra-red detector can receive the data carried in the infra-red signal and appropriate circuitry can place the data on bus 902. Bus 902 carries the data to main memory 906, from which processor 904 retrieves and executes the instructions. The instructions received by main memory 906 may optionally be stored on storage device 910 either before or after execution by processor 904.

Computer system 900 also includes a communication interface 918 coupled to bus 902. Communication interface 918 provides a two-way data communication coupling to a network link 920 that is connected to a local network 922. For example, communication interface 918 may be an integrated services digital network (ISDN) card or a modem to provide a data communication connection to a corresponding type of telephone line. As another example, communication interface 918 may be a local area network (LAN) card to provide a data communication connection to a compatible LAN. Wireless links may also be implemented. In any such implementation, communication interface 918 sends and receives electrical, electromagnetic or optical signals that carry digital data streams representing various types of information.

Network link 920 typically provides data communication through one or more networks to other data devices. For example, network link 920 may provide a connection through local network 922 to a host computer 924 or to data equipment operated by an Internet Service Provider (ISP) 926. ISP 926 in turn provides data communication services through the world wide packet data communication network now commonly referred to as the "Internet" 928. Local network 922 and Internet 928 both use electrical, electromagnetic or optical signals that carry digital data streams. The signals through the various networks and the signals on network link 920 and through communication interface 918, which carry the digital data to and from computer system 900, are exemplary forms of carrier waves transporting the information.

Computer system 900 can send messages and receive data, including program code, through the network(s), network link 920 and communication interface 918. In the Internet example, a server 930 might transmit a requested code for an application program through Internet 928, ISP 926, local network 922 and communication interface 918.

The received code may be executed by processor 904 as it is received, and/or stored in storage device 910, or other non-volatile storage for later execution. In this manner, computer system 900 may obtain application code in the form of a carrier wave.

At this point, it should be noted that although the invention has been described with reference to a specific embodiment, it should not be construed to be so limited. Various modifications may be made by those of ordinary skill in the art with the benefit of this disclosure without departing from the spirit of the invention. Thus, the invention should not be limited by the specific embodiments used to illustrate it but only by the scope of the issued claims and the equivalents thereof.

What is claimed is:

1. A machine implemented method, comprising:
rendering a first computer code portion of a file in a first section of a user interface, wherein the file comprises computer code in a textual form, wherein the file comprises the first computer code portion and a second computer code portion that is functionally contained within the first computer code portion;
processing the computer code in the file to extract one or more non-textual aspects of the computer code;
generating a topographic image to graphically represent the one or more non-textual aspects of the computer code, wherein generating the topographic image comprises positioning a second image portion corresponding to the second computer code portion within a first image portion corresponding to the first computer code portion to indicate that the second computer code portion is functionally contained within the first computer code portion, wherein the topographic image provides a graphical representation for all of the computer code in the file, and wherein the one or more non-textual aspects of the computer code comprises a functional aspect of the computer code;
rendering the topographic image in a second section of the user interface;
receiving an indication of user selection at a first position in the topographic image;
correlating the first position with a second position in the file; and
rendering a second portion of the file in the first section of the user interface, wherein the second position is within the second portion of the file.

2. The method of clam 1, further comprising:
receiving an indication of user selection at a third position in the file;
correlating the third position with a fourth position in the topographic image; and
updating the topographic image to provide an indication that the fourth position in the topographic image is a currently selected position.

3. The method of claim 1, further comprising:
determining that a third portion of the file is currently being rendered in the first section of the user interface;
correlating the third portion with a corresponding portion of the topographic image; and
updating the topographic image to provide an indication that the corresponding portion of the topographic image is currently rendered in the first section of the user interface.

4. The method of claim 1, further comprising:
gathering a set of thematic information based upon user manipulation of the computer code in the file; and
enhancing the topographic image to reflect the thematic information.

5. The method of claim 4, wherein the thematic information comprises recently selected positions in the file, and wherein enhancing the topographic image comprises:
correlating the recently selected positions with corresponding positions in the topographic image; and
updating the topographic image to indicate the corresponding positions in the topographic image.

6. The method of claim 4, wherein the thematic information comprises information indicating which particular portions of the file have been frequently updated, and wherein enhancing the topographic image comprises:
correlating the particular portions with corresponding portions of the topographic image; and
updating the topographic image to indicate the corresponding portions in the topographic image as being frequently updated.

7. The method of claim 1, wherein processing the computer code in the file comprises:
    transforming the computer code from a textual domain to another domain.

8. The method of claim 1,
    wherein the step of rendering the topographic image in a second section of the user interface includes making the topographic image visible in its entirety in the second section of the user interface;
    and further comprising repeating the steps of processing the computer code in the file extract one or more non-textual aspects of the computer code through rendering a second portion of the file in the first section of the user interface in response to receiving an indication that the file has been edited.

9. A non-transitory machine readable storage medium, comprising:
    instructions for causing one or more processors to render a first computer code portion of a file in a first section of a user interface, wherein the file comprises computer code in a textual form, wherein the file comprises the first computer code portion and a second computer code portion that is functionally contained within the first computer code portion;
    instructions for causing one or more processors to process the computer code in the file to extract one or more non-textual aspects of the computer code;
    instructions for causing one or more processors to generate a topographic image to graphically represent the one or more non-textual aspects of the computer code, wherein generating the topographic image comprises positioning a second image portion corresponding to the second computer code portion within a first image portion corresponding to the first computer code portion to indicate that the second computer code portion is functionally contained within the first computer code portion, wherein the topographic image provides a graphical representation for all of the computer code in the file, and wherein the one or more non-textual aspects of the computer code comprises a functional aspect of the computer code;
    instructions for causing one or more processors to render the topographic image in a second section of the user interface;
    instructions for causing one or more processors to receive an indication of user selection at a first position in the topographic image;
    instructions for causing one or more processors to correlate the first position with a second position in the file; and
    instructions for causing one or more processors to render a second portion of the file in the first section of the user interface, wherein the second position is within the second portion of the file.

10. The non-transitory machine readable storage medium of claim 9, further comprising:
    instructions for causing one or more processors to receive an indication of user selection at a third position in the file;
    instruction for causing one or more processors to correlate the third position with a fourth position in the topographic image; and
    instructions for causing one or more processors to update the topographic image to provide an indication that the fourth position in the topographic image is a currently selected position.

11. The non-transitory machine readable storage medium of claim 9, further comprising:
    instructions for causing one or more processors to determine that a third portion of the file is currently being rendered in the first section of the user interface;
    instructions for causing one or more processors to correlate the third portion with a corresponding portion of the topographic image; and
    instructions for causing one or more processors to update the topographic image to provide an indication that the corresponding portion of the topographic image is currently rendered in the first section of the user interface.

12. The non-transitory machine readable storage medium of claim 9, further comprising:
    instructions for causing one or more processors to gather a set of thematic information based upon user manipulation of the computer code in the file; and
    instructions for causing one or more processors to enhance the topographic image to reflect the thematic information.

13. The non-transitory machine readable storage medium of claim 12, wherein the thematic information comprises recently selected positions in the file, and wherein the instructions for causing one or more processors to enhance the topographic image comprises:
    instructions for causing one or more processors to correlate the recently selected positions with corresponding positions in the topographic image; and
    instructions for causing one or more processors to update the topographic image to indicate the corresponding positions in the topographic image.

14. The non-transitory machine readable storage medium of claim 12, wherein the thematic information comprises information indicating which particular portions of the file have been frequently updated, and wherein the instructions for causing one or more processors to enhance the topographic image comprises:
    instructions for causing one or more processors to correlate the particular portions with corresponding portions of the topographic image; and
    instructions for causing one or more processors to update the topographic image to indicate the corresponding portions in the topographic image as being frequently updated.

15. The non-transitory machine readable storage medium of claim 9, wherein the instructions for causing one or more processors to process the computer code in the file comprises:
    instructions for causing one or more processors to transform the computer code from a textual domain to another domain.

16. The non-transitory machine readable storage medium of claim 9,
    wherein the instructions for causing one or more processors to render the topographic image in a second section of the user interface include instructions for causing one or more processors to make the topographic image visible in its entirety in the second section of the user interface;
    and further comprising instructions for causing one or more processors to repeat the instructions for causing the one or more processors to process the computer code in the file extract one or more non-textual aspects of the computer code through the instructions for causing one or more processors to render a second portion of the file in the first section of the user interface in response to receiving an indication that the file has been edited.

* * * * *